Patented Sept. 3, 1929.

1,726,648

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

SUBSTITUTED DITHIOCARBAMATES AND METHOD OF MAKING SAME.

No Drawing.  Application filed March 2, 1928. Serial No. 258,674.

This invention relates to new chemical compounds, the dinitro chloro phenyl disubstituted dithiocarbamates, and particularly to the 2-6 dinitro 4 chloro phenyl dialkyl dithiocarbamates.

2-6 dinitro-4- chloro phenyl dimethyl dithiocarbamate may be prepared as follows and is believed to have the formula

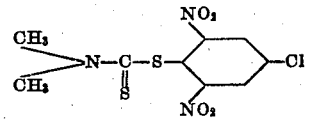

45 grams of dimethylamine are dissolved in 1000 cc. of alcohol and to this solution are added 76 grams of carbon disulphide. To this mixture are then added 40 grams of caustic soda dissolved in a small amount of water, the whole mixture being kept cool throughout. The result is an alcoholic solution of sodium dimethyl dithiocarbamate. To this mixture are then added 237 grams of 2-6 dinitro 1,4 dichloro-benzol and the whole heated to 50-60° C. for 3/4 of an hour. The reaction mixture is then cooled and the product which is the 2-6 dinitro 4 chlorophenyl dimethyl dithiocarbamate crystallizes out. It is filtered from the alcohol, washed free from sodium chloride and dried.

2-6 dinitro 4 chlorophenyl dimethyl dithiocarbamate has a melting point after crystallization from alcohol of 123° C. (uncorrected). The compound is soluble in benzol, acetone, and hot alcohol, but is only slightly soluble in cold alcohol and insoluble in water.

The same procedure may be employed in making other dialkyl derivatives and if desired the compounds may be made directly from a solution of a dialkyl dithiocarbamate salt instead of forming this reaction product as described in the foregoing procedure.

These compounds may be used for the acceleration of the vulcanization of rubber.

Having thus described my invention, what I claim and desire to protect by Letters Patent is:

1. As new compounds the 2-6 dinitro 4 chlorophenyl dialkyl dithiocarbamates.

2. As new compounds 2-6 dinitro 4 chloro phenyl dimethyl dithiocarbamates.

3. A method of making 2-6 dinitro 4 chloro phenyl dialkyl dithiocarbamates which comprises treating a solution of a metallic dialkyl dithiocarbamate with 2-6 dinitro 1-4 dichloro benzol, heating until the reaction is completed, cooling and separating the product, and purifying it by washing free from soluble chlorides.

4. A method of making 2-6 dinitro 4 chloro phenyl dimethyl dithiocarbamates which comprises treating a solution of a metallic dimethyl dithiocarbamate with 2-6 dinitro 1-4 dichloro benzol, heating until the reaction is completed, cooling and separating the product, and purifying it by washing free from soluble chlorides.

Signed at New York, county and State of New York, this 23rd day of February, 1928.

SIDNEY M. CADWELL.